(12) United States Patent
Gorajala Chandra (10) Patent No.: US 10,362,608 B2
(45) Date of Patent: Jul. 23, 2019

(54) MANAGING WIRELESS CLIENT CONNECTIONS VIA NEAR FIELD COMMUNICATION

(71) Applicant: Fortinet, Inc., Sunnyvale, CA (US)

(72) Inventor: Sekhar Sumanth Gorajala Chandra, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/098,042

(22) Filed: Apr. 13, 2016

(65) Prior Publication Data
US 2018/0332630 A1    Nov. 15, 2018

(51) Int. Cl.
| *H04W 76/10* | (2018.01) |
| *H04W 4/80* | (2018.01) |
| *H04W 48/14* | (2009.01) |
| *H04L 29/06* | (2006.01) |
| *H04W 12/06* | (2009.01) |
| *H04W 12/08* | (2009.01) |

(52) U.S. Cl.
CPC ........... *H04W 76/10* (2018.02); *H04L 63/062* (2013.01); *H04L 63/0876* (2013.01); *H04W 4/80* (2018.02); *H04W 12/06* (2013.01); *H04W 12/08* (2013.01); *H04W 48/14* (2013.01)

(58) Field of Classification Search
CPC ..... H04W 76/10; H04W 12/06; H04W 12/08; H04W 4/80; H04W 48/14; H04L 68/0876; H04L 63/062
See application file for complete search history.

(56) References Cited

U.S. PATENT DOCUMENTS

| 2007/0079113 A1* | 4/2007 | Kulkarni | H04L 63/0492 713/150 |
| 2007/0190939 A1* | 8/2007 | Abel | H04B 5/0031 455/41.2 |
| 2009/0325484 A1* | 12/2009 | Lele | H04W 8/205 455/41.1 |
| 2010/0068997 A1* | 3/2010 | Dunko | H04W 48/08 455/41.1 |
| 2012/0079123 A1* | 3/2012 | Brown | H04M 1/7253 709/228 |
| 2015/0065126 A1* | 3/2015 | Jung | H04W 48/16 455/434 |
| 2015/0188949 A1* | 7/2015 | Mahaffey | H04L 63/20 726/1 |
| 2016/0379426 A1* | 12/2016 | Tholen | G07C 9/00015 340/5.21 |

* cited by examiner

*Primary Examiner* — Albert T Chou
(74) *Attorney, Agent, or Firm* — Jaffery Watson Mendonsa & Hamilton LLP (57) ABSTRACT

Systems and methods for automatically obtaining WiFi profile data from an NFC device are provided. According to one embodiment, a client security application obtains a WiFi profile of a WiFi network via a near-field communication (NFC) device of the WiFi client device and establishes a WiFi connection with the WiFi network using the WiFi profile.

12 Claims, 7 Drawing Sheets

MANAGING WIRELESS CLIENT CONNECTIONS VIA NEAR FIELD COMMUNICATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of wireless network security techniques. In particular, various embodiments relate to methods for managing wireless network connections via near field communication (NFC) devices.

Description of the Related Art

Wireless access points (APs) are deployed to cover public areas, offices, enterprise campuses, households and the like so that WiFi-enabled devices (i.e., IEEE 802.11x enabled devices) may be connected to a private network or the Internet through a wireless network. Usually, a large number of APs are deployed in an enterprise network and the APs are connected to a wireless access point controller (AC) and are managed by the AC. The APs may retrieve AP profiles from the AC and use the AP profiles in managing wireless connectivity. An AP profile typically includes connection-related information including, for example, radio settings (such as band (e.g., 802.11g) and channel selection), the service set identification (SSID) to which it applies, security settings, the authentication mechanism and encryption. Usually, an AP of the enterprise network may broadcasts the SSID defined in the AP profile and then waits for a WiFi client to request to connect. When a WiFi client of a user of the enterprise network requests to connect to the AP, the WiFi client is required to authenticate itself according to the authentication mechanism defined in the AP profile. For example, the WiFi client may be required to go through a Wireless Protected Access 2 (WPA2)-Enterprise network type authentication in which the username and password of the enterprise user are required and authenticated by an authentication server. After the WiFi client is authenticated by the authentication server, the AP may allow the WiFi client to access the WiFi network.

For guests who do not have accounts at the authentication server, a private network usually provides a dedicated AP profile that uses a less secure mechanism to access limited resources of the private network. In one example, the dedicated AP profile may include an SSID and no security mechanism in order that WiFi clients of guests can connect to the private network without any authentication and encryption. However, it is not safe for the WiFi clients as the WiFi traffic is not encrypted and may be intercepted by third parties. In a second example, the dedicated AP profile may include an SSID and a fixed password. The password may be printed out and provided to the guests to allow them to connect to an AP of the private network. For restaurants, coffee shops, shopping malls and etc., they usually manage the guest usage of their WiFi network in accordance with the second example above and passwords of their WiFi networks are readily distributed to their customers. Typically, the customers are allowed to use the WiFi networks for a certain period of time before the password expires. In the second example, if the password for guest WiFi access is not changed frequently, it may become unsafe as too many users know the password. However, when the password is changed frequently, it is inconvenient for the users as they have to manually reenter the new password at the WiFi client device again.

As mentioned above, connecting to a WiFi network without a security mechanism is not safe for WiFi clients or the WiFi network. Meanwhile, connecting to a WiFi network with a security mechanism and/or user authentication is inconvenient for WiFi users. Therefore, there is a need for improving user management of WiFi networks.

SUMMARY

Systems and methods are described for automatically obtaining WiFi profile data through an NFC device. According to one embodiment, a client security application obtains a WiFi profile of a WiFi network via a near-field communication (NFC) device of the WiFi client device and establishes a WiFi connection with the WiFi network using the WiFi profile.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for automatically obtaining AP profile data from an NFC tag or peer device. Nowadays, more and more portable devices (smartphones, touch pads, tablet computers, etc.) are equipped with near-field communication (NFC) devices. NFC allows two electronic devices to establish data communication by bringing them close to each other. Smartphones with NFC can read data from NFC tags or exchange information, such as name cards, with other NFC-enabled devices. Therefore, it is safe and convenient for a client security application to manage WiFi profiles via NFC communication with an AC. According to one embodiment, a client security application obtains a WiFi profile of a WiFi network by a near-field communication (NFC) device of the WiFi client device and establishes a WiFi connection with the WiFi network using the WiFi profile.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "client device" generally refers to a computing device that may access resources through a network connection. A client device may be an endpoint device located at or near the edge of a network and that is capable of running one or more applications for a single user. Examples of client devices include, but are not limited to, desktop or laptop personal computers (PCs), handheld computers, tablets and smartphones.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam.

Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Figure 1:
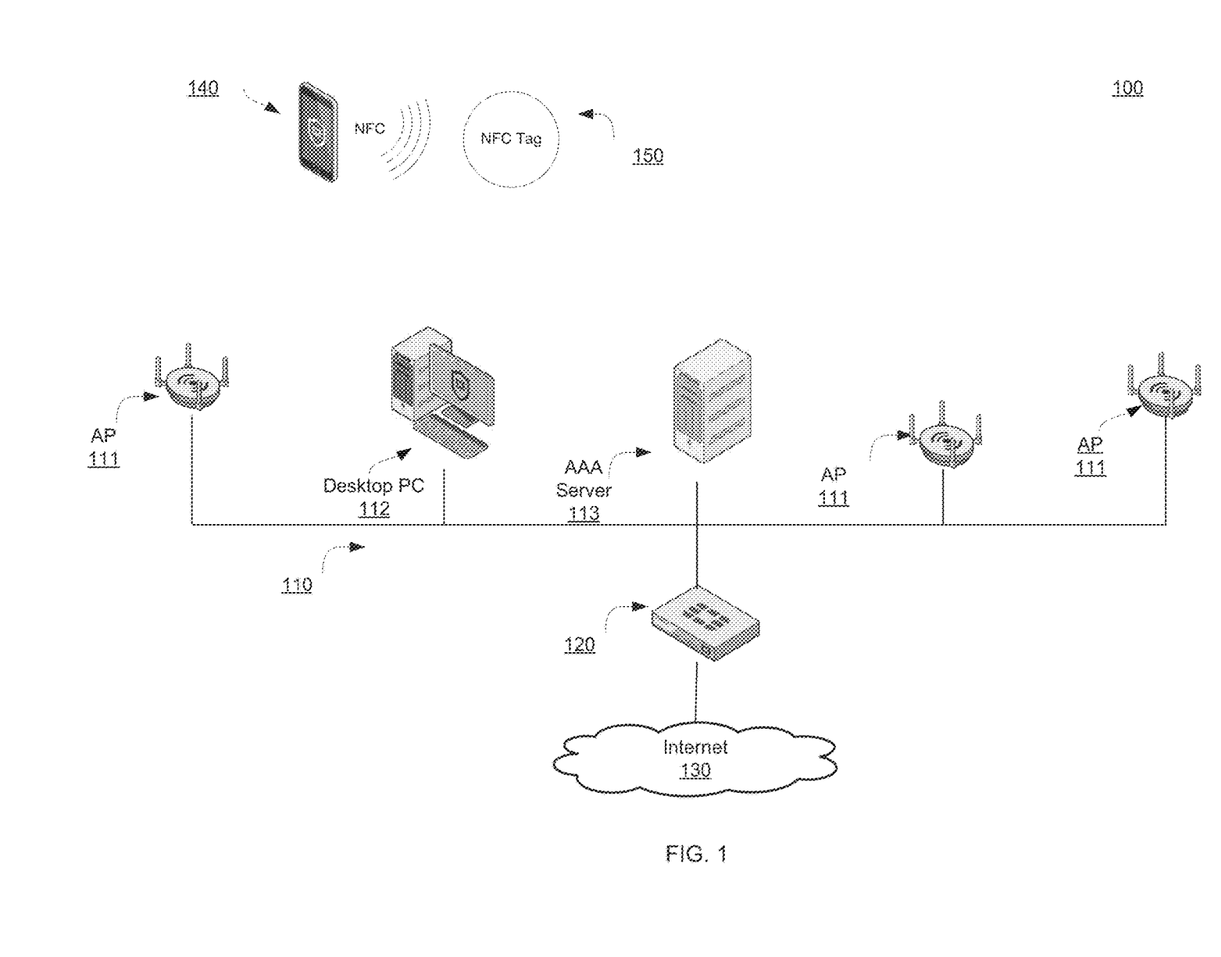
FIG. 1 is a block diagram illustrating an exemplary network architecture in which embodiments of the present invention may be employed.

FIG. 1 illustrates an exemplary network architecture 100 in accordance with an embodiment of the present invention. In the context of the present example, network architecture 100 includes a private network 110 which is connected to the Internet 130. Private network 110 includes multiple network appliances, such as multiple APs 111, a desktop PC 112, an authentication, authorization, accounting (AAA) server 113 and other computing devices that are operatively coupled to each other through a Local Area Network (LAN), wherein the LAN is then operatively coupled with a network security appliance 120 which enables access to Internet 130.

Network security appliance 120 separates the external computing environment, represented by Internet 130, from the internal computing environment of private network 110. Network security appliance 120 may intercept communications between Internet 130 and the network devices connected to or within private network 110 and may, among other things, scan for malware, viruses or high risk network accesses. Network security appliance 120 may include an AC module that manages the operations of APs 111 of private network 110. When AP 111 is connected to private network 111, a management channel, e.g., a Control and Provisioning of Wireless Access Points (CAPWAP) control tunnel, may be established between AP 111 and the AC module. The AC module may distribute operating system images, configuration settings and/or WiFi profiles to AP 111. WiFi profile may include service set identification (SSID), security type, encryption type, security key and user credentials that will be used by APs 111 and WiFi client devices to establish wireless LAN connections. The AC module may also manage the traffic transferred to/from APs 111 based on security policies and load-balance network traffic among adjacent fixed APs 111.

AAA server 113 is used to authenticate WiFi client 120 according to authentication protocols, including, but not limited to, IEEE 802.1x security authentication. User credentials entered by a user when he/she is trying to connect to the WiFi network may be authenticated by AAA server 113. If the user credentials are correct, APs 111 may allow the WiFi client device to connect to private network 110.

In the present example, an NFC tag 150 is placed at a location that is convenient for NFC-enabled WiFi clients to scan. For example, a coffee shop may attach NFC tag 150 to a cash register and an office may place NFC tag 150 at its front desk. A WiFi profile that is being used by APs 111 may be written to NFC tag 150 by an NFC writer (not shown) that is operationally coupled to network security appliance 120. Usually, the WiFi profile is created by the AC module of network security appliance 120 for guests who temporally access private network 110 or the Internet 130 and do not have user accounts within private network 110. The WiFi profile may be changed periodically by the AC module to keep it safe. For example, the password for access to the AP or user credentials for access to APs 111 may be periodically changed by the AC module and the updated WiFi profile may be written to NFC tag 150 by the NFC writer.

In the present example, a WiFi client device 140, e.g., a smartphone, is equipped with an NFC module. A client security application, e.g., a FortiClient endpoint protection application available from the assignee of the present invention, is installed on WiFi client device 140. When WiFi client device 140 is placed in close proximity with NFC tag 150 (e.g., within about 4 cm or so), the client security application reads data from NFC tag 150 through its NFC module. The WiFi profile created by the AC module may be retrieved from the data and may be stored within a WiFi profile repository of WiFi client device 140. The client security application may scan for the SSID included in the WiFi profile and connect to the AP that is broadcasting the SSID using the credentials included in the WiFi profile. Therefore, when a guest needs to access a WiFi network, he/she may launch the client security application at his/her mobile device (e.g., a smartphone, laptop or tablet computer) and place the mobile device near an NFC tag. The client security application may then obtain the WiFi profile and connect to the WiFi network automatically. If the WiFi profile is updated during the time period of use by the guest user, the user may simply rescan NFC tag 150 to automatically obtain the updated WiFi profile.

Figure 2:
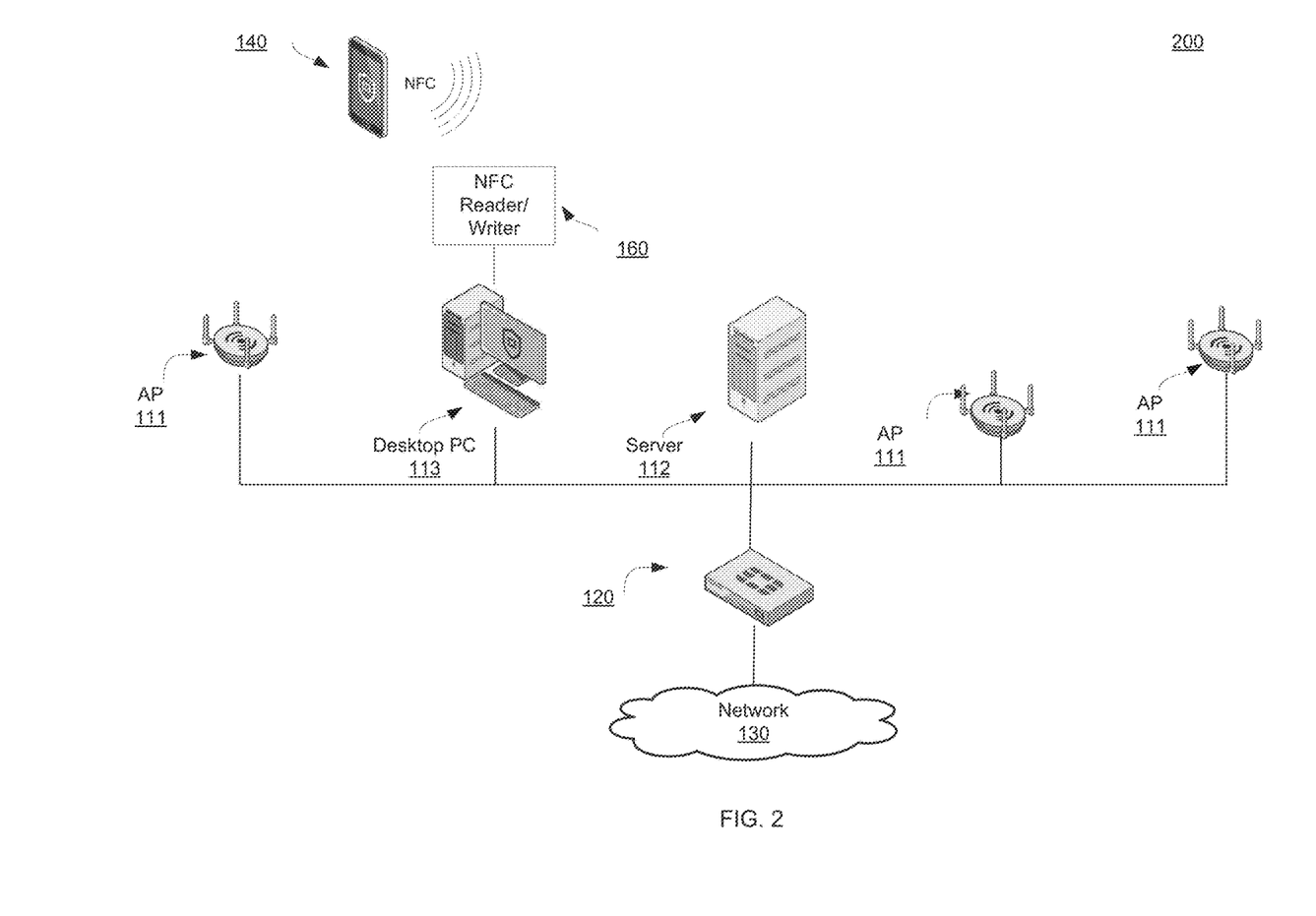
FIG. 2 is a block diagram illustrating another exemplary network architecture in which embodiments of the present invention may be employed.

FIG. 2 illustrates another exemplary network architecture 200 in accordance with an embodiment of the present invention. In FIGS. 1 and 2, elements with same reference number indicate that the element is the same or substantially similar to each other and a description thereof with reference to FIG. 2 will be omitted for sake of brevity.

In the example of FIG. 2, an NFC reader/writer 160 is operationally coupled to the AC module of network security appliance 120. For example, NFC reader/writer 160 may be coupled to a desktop computer 113 coupled to private network 110 and network security appliance 120 may access NFC reader/writer 160 through appropriate Application Programming Interfaces (APIs) provided by an NFC driver program running within desktop computer 113. Both the NFC module of WiFi client device 140 and NFC reader/writer 160 work in peer-to-peer mode. An NFC bidirectional connection is established when NFC-enabled WiFi client 140 is placed in close proximity to NFC reader/writer 160. Data may be exchanged between WiFi client device 140 and the AC module through the NFC connection after the NFC connection is established. An identification of WiFi client device 140, e.g., a media access control (MAC) address, a device name or an email address of the user of WiFi client device 140, may be transmitted to the AC module by the client security application running on WiFi client device 140. A WiFi profile that is unique to the identification of the WiFi client device may be created by the AC module and transmitted back to WiFi client device 140 through the peer-to-peer NFC connection. Then, WiFi client device 140 may connect to the WiFi network using the WiFi profile received through the NFC connection. In this manner, a guest WiFi client device may connect to a WiFi network using a WiFi profile with a user authentication that is unique to the guest but that does not require the user of the guest WiFi client device to manually enter the user authentication information.

Figure 3:
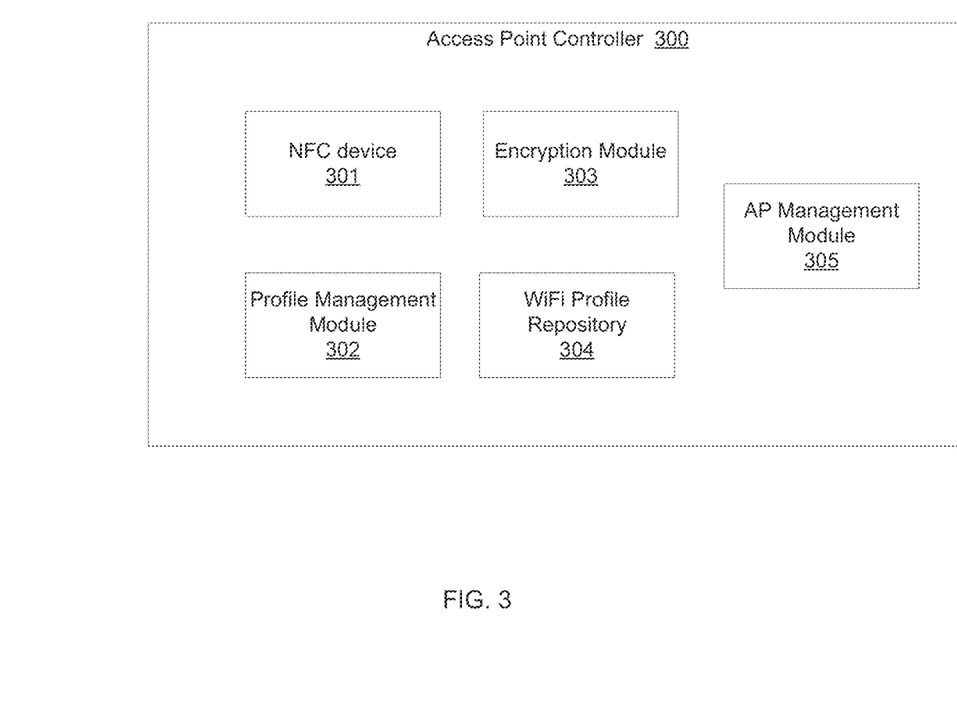
FIG. 3 is a block diagram illustrating functional units of an access point controller (AC) that manages AP profiles in accordance with an embodiment of the present invention.

FIG. 3 is a block diagram illustrating functional units of an access point controller (AC) 300 that manages WiFi profiles by NFC in accordance with an embodiment of the present invention. In the context of the present example, AC 300 may be a standalone AC, e.g., a FortiAC from the assignee of the present application, or may be an AC module implemented within a network security appliance, e.g., one of the FortiGate family of ASIC-accelerated firewalls or one of the FortiWiFi family of network security appliances manufactured by the assignee of the present invention. AC 300 may also be a cloud-based access point controller that manages APs across networks. AC 300 may comprise an NFC device 301, a profile management module 302, an encryption module 303, a WiFi profile repository 304, and an AP management module 305.

NFC device 301 may be an NFC reader/writer module that is integrated within AC 300. In another example, NFC device 301 may be a standalone NFC reader/writer that is connected to AC 300 through a Universal Serial Buss (USB) cable, for example. In a further example, if AC 300 is located in a secure area that is not directly accessible by a peer NFC device, NFC device 301 may be connected to a desktop computer that is easy for the peer NFC device to access. AC 300 may operationally be coupled to NFC device 301 through the desktop computer with appropriate APIs. NFC device 301 may be based on the ISO/IEC 18092 NFC IP-1 and ISO/IEC 14443 contactless smart card standards and may work in the following three modes:

In reader/writer mode, the NFC device is capable of reading NFC Forum-mandated tag types, such as a tag embedded in an NFC smart poster or write data to an NFC tag.

In Peer-to-Peer mode, two NFC devices can exchange data using such as NFC Data Exchange Format (NDEF) message.

In Card Emulation mode, the NFC device appears to an external reader much the same as a traditional contactless smart card.

In the present example, NFC device 301 may be set to work in either writer mode or peer-to-peer mode by profile management module 302 as described below.

Profile management module 302 is used for managing WiFi profiles that are used by APs of private network and WiFi client devices. In one example, profile management module 302 may create a WiFi profile for guests of the private network. The WiFi profile may include an SSID, a security type (e.g., Wired Equivalent Privacy (WEP), WPA, WPA2 and IEEE 802.1x and an encryption type, e.g., as Advanced Encryption Standard (AES) or Temporal Key Integrity Protocol (TKIP). The WiFi profile may also include a security key that is used for encrypting the WiFi network traffic or user credentials that are used for user authentication by a Remote Authentication Dial-In User Service (RADIUS) server of the private network. The WiFi profile may be pushed to the APs of the private network by profile management module 302 through a secure tunnel, e.g., a CAPWAP tunnel. Profile management module 302 may set NFC device 301 to writer mode and write the WiFi profile to an NFC tag so that an NFC-enabled WiFi client may obtain the WiFi profile by scanning the NFC tag. Profile management module 302 may change the settings of the WiFi profile periodically to improve the security of the guest WiFi access. For example, profile management module 302 may change the security key or user credentials of the WiFi profile every day and push the updated WiFi profile to the APs of the private network and write it to the NFC tag through NFC device 301. NFC-enabled WiFi client may obtain the updated WiFi profile by scanning the NFC tag.

In another example, profile management module 302 may set NFC device 301 to peer-to-peer mode and establish an NFC connection with a peer NFC-enabled WiFi client. Profile management module 302 may receive an identification of the WiFi client through the NFC connection, e.g., a MAC address, a machine name of the WiFi client or an email address of the user of the WiFi client. In one example, profile management module 302 may create a guest WiFi profile by assigning a security key that is unique to the identification. In another example, profile management module 302 may create a guest account within the RADIUS server of the private network based on the identification of the WiFi client and incorporate the guest account into a guest WiFi profile to authenticate the guest WiFi client device. Profile management module 302 may push the guest WiFi profile to APs of the private network through CAPWAP tunnels and transmit it back to the NFC-enabled WiFi client through the NFC connection.

In some examples, the WiFi profile may be encrypted to cipher text by encryption module 303 before it is written to the NFC tag or transmitted to a peer NFC-enabled WiFi client. The encryption algorithm and corresponding encryption parameters may be defined and can be configured by profile management module 302 or selected by the administrator of the private network. The client security application that is installed on the NFC-enabled WiFi client may obtain the encryption information when it is registered with the private network. The client security application can decrypt the WiFi profile from the cipher text obtained from the NFC tag or peer NFC device 301 using the encryption information.

In some examples, WiFi profile repository 304 is used for storing WiFi profiles, such as WiFi profiles for guests, that are created by profile management module 302. For example, guests who would like to visit an office may have made appointments using their email addresses. As such, profile management module 302 may have a list of guests who may access the WiFi network of the office during a certain time period. Therefore, profile management module 302 may create a guest WiFi profile for each of guest based on the email address in the guest list and store the guest WiFi profiles at WiFi profile repository 304. The guest WiFi profiles may be written to an NFC tag and pushed to APs through CAPWAP tunnels. When a guest arrives at the office, he/she may scan the NFC tag using his/her mobile device and obtain the guest WiFi profile data. The client security application on the mobile device will obtain the WiFi profile that was created for the guest and connect to the WiFi network using the WiFi profile.

AP management module 305 is used for managing APs that are connected with access point controller 300. For example, AP management module 305 may establish CAPWAP tunnels with APs of a private network and push configuration information, including, but not limited to, WiFi profiles, to APs through a CAPWAP command tunnel and transmit network traffic to/from the APs through a CAPWAP data tunnel. As the functionality and structure of AP management module 305 are well known to those skilled in the art further description is omitted for sake of brevity.

Figure 4:
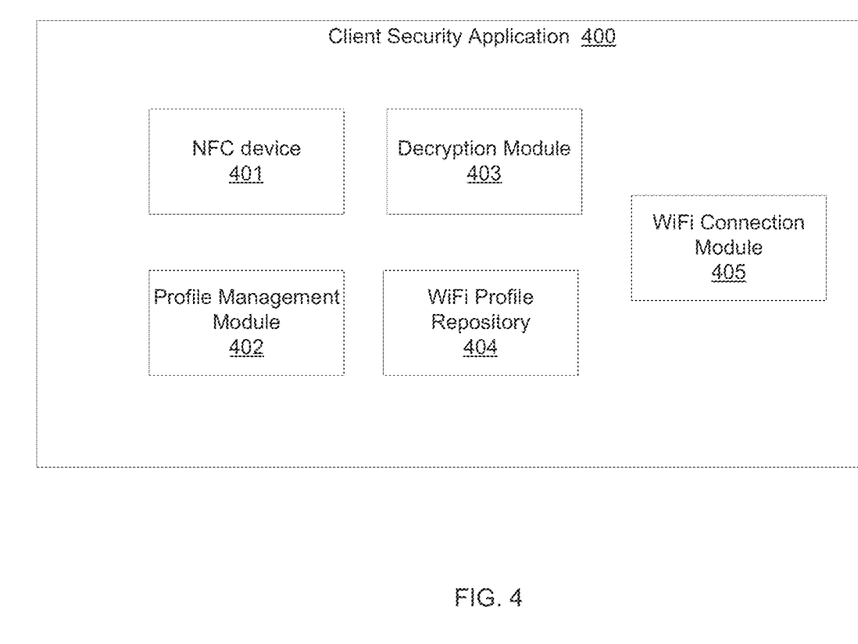
FIG. 4 is a block diagram illustrating functional units of a client security application that manages AP profiles in accordance with an embodiment of the present invention.

FIG. 4 is a block diagram illustrating various functional units of a client security application 400 in accordance with an embodiment of the present invention. Client security application 400 is an application, e.g., a FortiClient endpoint protection application developed by the assignee of the present invention, that is installed on a client device to provide endpoint protection, such as virus scanning, remote access, intrusion prevention as well as WiFi connection management.

In the present example, client security application 400 may include an NFC device 401, a decryption module 402, a profile management module 403, a WiFi profile repository 404 and a WiFi connection module 405.

NFC device 401, in one example, may be an NFC module that is integrated with a WiFi client device or an NFC reader/writer that is connected to the WiFi client device through a Universal Serial Bus (USB) interface, for example. NFC device 401 may work in reader mode and read out data stored in an NFC tag by placing NFC device 401 in close proximity to the NFC tag. NFC device 401 may also work in peer-to-peer mode and exchange data with a peer NFC device.

Profile management module 402 is used for managing WiFi configuration profiles within client security application 400. When a user, e.g., a guest of a WiFi network, wants to access the WiFi network, client security application 400 may be launched on the user's NFC-enabled WiFi client (e.g., a smartphone, tablet computer or other mobile device having NFC functionality) and the WiFi client may be brought in close proximity to an NFC tag that contains guest WiFi profile data created by an access point controller of the WiFi network, for example. Then, responsive to detection of the NFC tag, profile management module 402 may set the NFC device 401 to reader mode and read out data from the NFC tag. In another example, profile management module 402 may set NFC device 401 to peer-to-peer mode and establish an NFC connection with the access point controller. In one embodiment, an identification of the WiFi client device, e.g., a MAC address or machine name of the WiFi client device, may be transmitted to the access point controller by profile management module 402. Then, a WiFi profile that is unique to the identification may be received by profile management module 402 through the NFC connection. If the data of the WiFi profile is encrypted by the access point controller, decryption module 403 may be used for decrypting cipher text to plain text. The encryption key may be received by decryption module 402 when client security application 400 is initially registered with the private network or may be entered by the user of the WiFi client device. Then, profile management module 402 may create a WiFi profile on the WiFi client device by storing the guest WiFi profile data to WiFi profile repository 404. After the guest WiFi profile is created, WiFi connection module 405 may establish a WiFi connection with an AP of the private network based on the guest WiFi profile obtained from the NFC tag. For example, WiFi connection module 405 may scan for the SSID designated in the WiFi profile and use the authentication information designated in the WiFi profile to authenticate the WiFi client. The process of establishing a WiFi connection between a WiFi client and a WiFi network is well-known to those skilled in the art. As such, further description will be omitted for sake of brevity.

Figure 5:
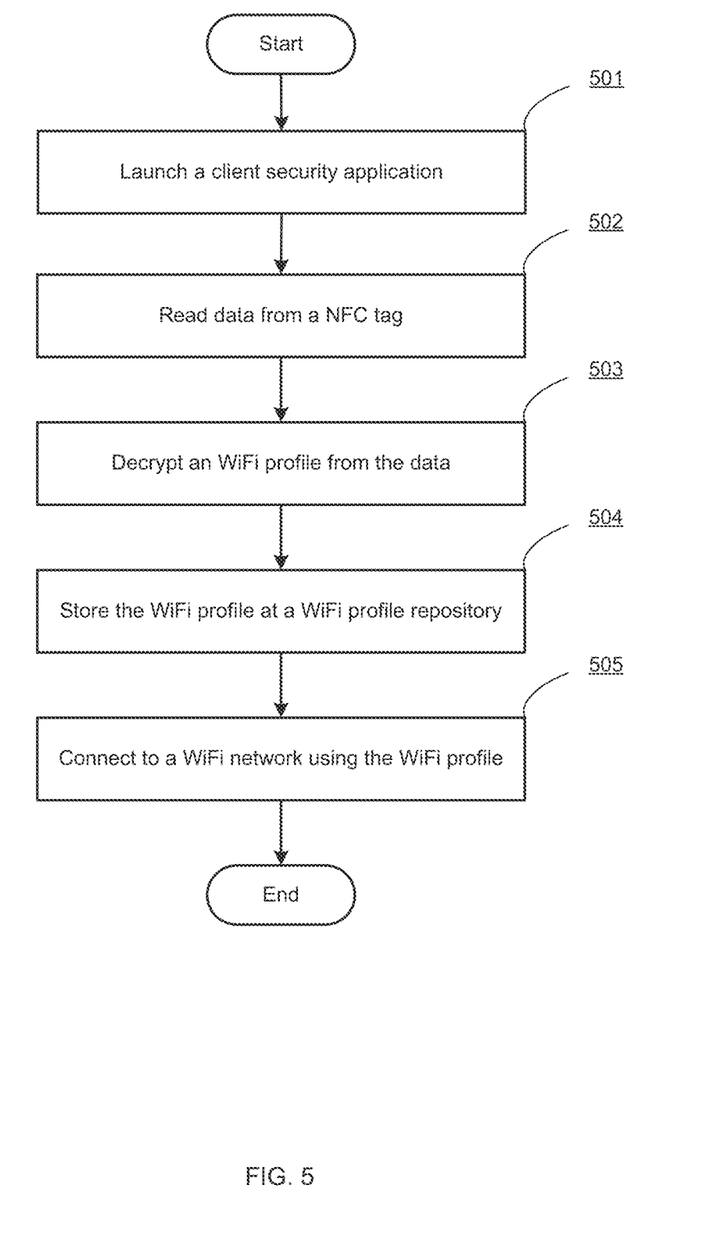
FIG. 5 is a flow diagram illustrating the process of reading an AP profile from an NFC tag and connecting to a WiFi network by a client security application in accordance with an embodiment of the present invention.

FIG. 5 is a flow diagram illustrating automated creation of a WiFi profile and launching of a WiFi connection by a client security application in accordance with an embodiment of the present invention.

At block 501, a user of an NFC-enabled WiFi client device launches a client security application and places the NFC-enabled WiFi client in close proximity to an NFC tag containing data representative of parameters of a WiFi profile.

At block 502, the client security application sets an NFC device of WiFi client device to reader mode and causes the NFC device to read data out of the NFC tag.

At block 503, if the data read out of the NFC tag is encrypted, the client security application may decrypt the cipher text using an encryption key to obtain the corresponding plain text. In one example, when the client security application is registered with an access point controller (AC) of the WiFi network, the encryption key may be transferred to the client security application from the AC through a physical (e.g., cable) connection or other secure connection over a network. In another example, the encryption key may be obtained by the client security application through a separate channel or may be manually input by the user of the client security application.

At block 504, responsive to receipt and processing of data of the WiFi profile, the client security application may create a new WiFi profile and store the parameters obtained from the NFC tag in a WiFi profile repository within the WiFi client device. In some embodiments, all required parameters of the WiFi profile are automatically obtained from the NFC tag without requiring manual input.

At block 505, the client security application may further launch a WiFi connection with an AP based on the newly created WiFi profile.

Figure 6:
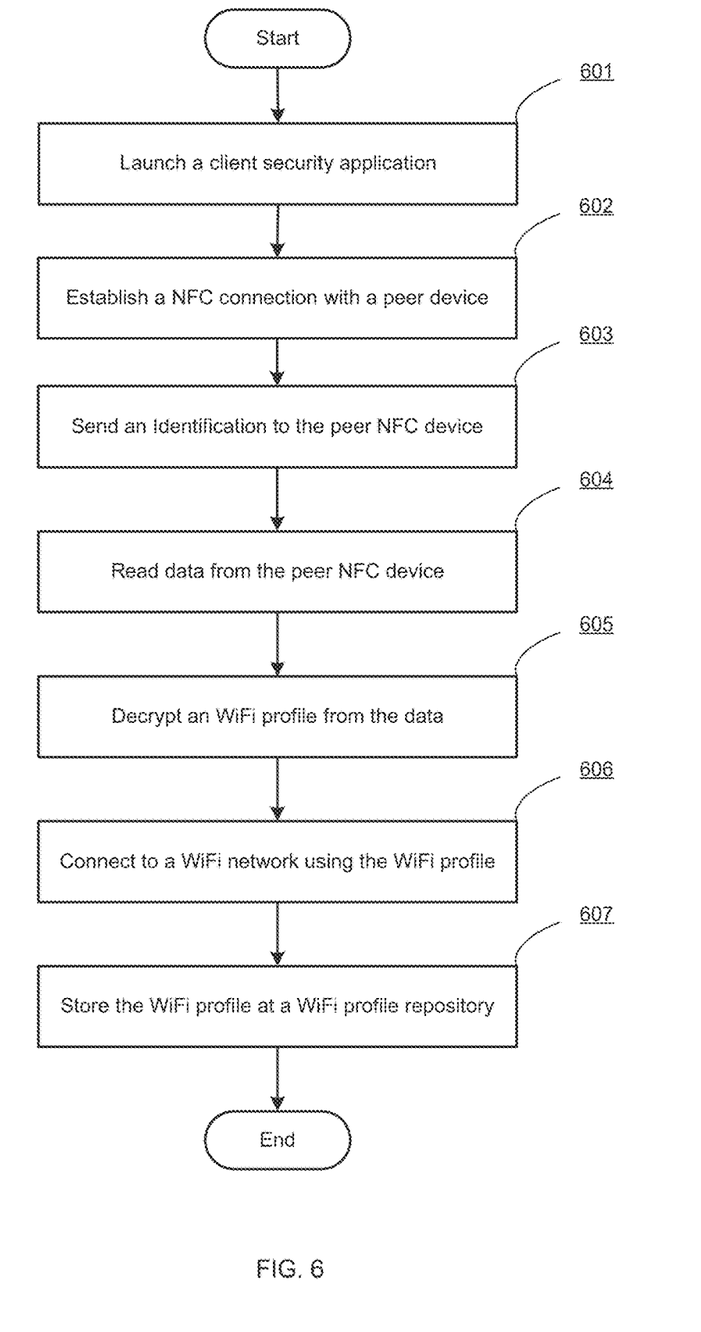
FIG. 6 is a flow diagram illustrating the process of reading an AP profile from a peer NFC device and connecting to a WiFi network by a client security application in accordance with an embodiment of the present invention.

FIG. 6 is a flow diagram illustrating automated creation of a WiFi profile and launching of a WiFi connection by a client security application in accordance with another embodiment of the present invention.

At block 601, a user of an NFC-enabled WiFi client device launches a client security application and places the NFC-enabled WiFi client in close proximity with a peer NFC device. The peer NFC device is coupled to an AC of a private network.

At block 602, the client security application sets an NFC device of the WiFi client to peer-to-peer mode and establishes an NFC connection with the peer NFC device.

At block 603, an identification of the WiFi client device is transmitted to the peer NFC device through the NFC connection. The identification of the WiFi client may be collected from the client security application running on the WiFi client.

At block 604, the client security application receives WiFi profile data from the AC through the NFC connection.

At blocks 605-607, the client security application creates a WiFi profile at the WiFi client device and connects to an AP using the WiFi profile received by NFC connection in the same way as described above with reference to blocks 503-505 of FIG. 5.

Figure 7:
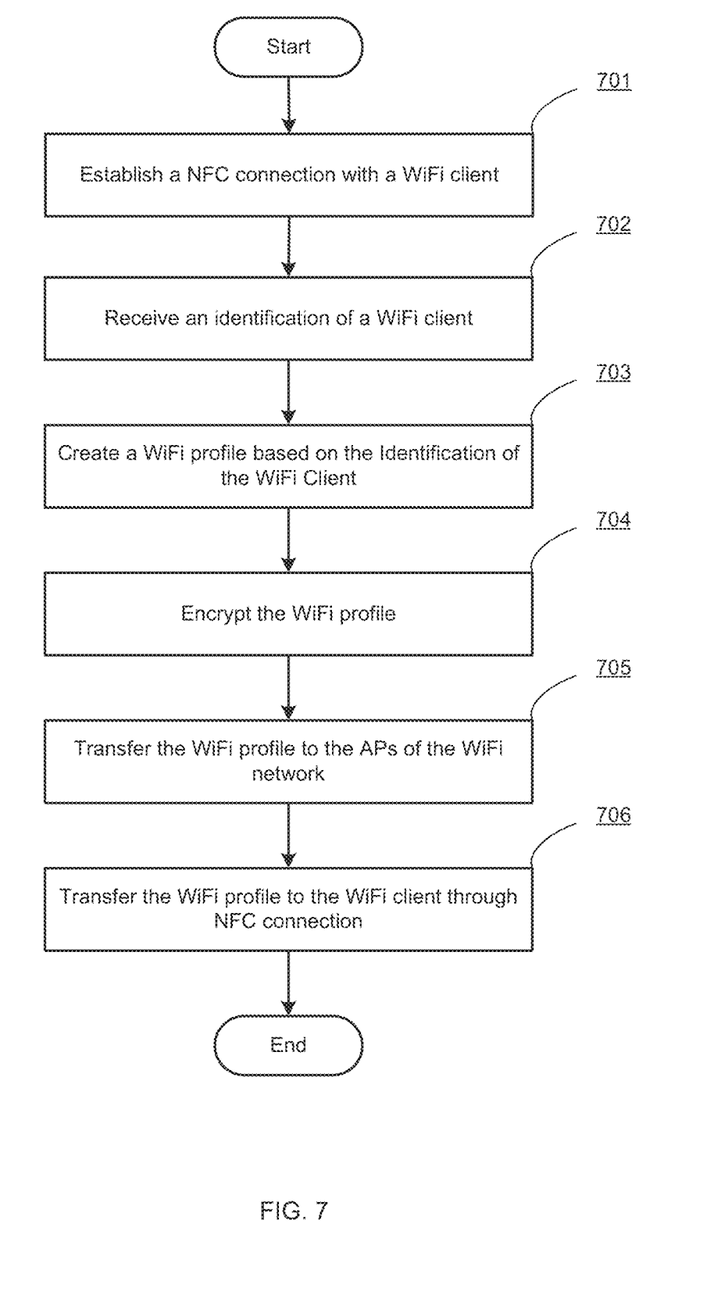
FIG. 7 is a flow diagram illustrating the process of creating of an AP profile by an AC and sending the AP profile to a WiFi client through an NFC connection in accordance with an embodiment of the present invention.

FIG. 7 is a flow diagram illustrating the process of creating of an WiFi profile by an AC and sending the AP profile to a WiFi client through an NFC connection in accordance with an embodiment of the present invention.

At block 701, an AC sets an NFC device that is operationally coupled to the AC to peer-to-peer mode and establishes an NFC connection with an NFC-enabled WiFi client.

At block 702, the AC receives an identification of the NFC-enabled WiFi client. Non-limiting examples of the identification of the WiFi client include a MAC address, a device name or an email address.

At block 703, the AC creates a WiFi profile based on the identification of the WiFi client. The WiFi profile may include parameters that are used for the WiFi client to connect to the WiFi network through an AP. The parameters may include one or more of an SSID, a security type, an encryption type, a security key and user credentials. The WiFi profile may be unique to the WiFi client. For example, the security key or user credentials of the WiFi profile may be uniquely generated by the AC based on the MAC address or device name of the WiFi client.

At block 704, the WiFi profile that is created by the AC is encrypted if necessary. The encryption algorithm and related parameters may be negotiated with the client security application when the client security application is registered with the AC.

At block 705, the WiFi profile is transferred to the APs of the WiFi network so the WiFi profile will be accepted by the APs when used by the WiFi client to access the WiFi network.

At block 706, the WiFi profile is transferred to the WiFi client through the NFC connection.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    establishing, by a client security application running on a WiFi client device and managing the security of the WiFi client device, a near-field communication (NFC) connection via an NFC device of the WiFi client device with a peer NFC device that is coupled to a wireless access point controller (AC) of a WiFi network;
    causing the AC to dynamically create a WiFi profile associated with the WiFi network by transmitting, by the client security application, identification information associated with the WiFi client device to the AC through the NFC connection;
    obtaining, by the client security application, the WiFi profile via the NFC device, wherein the WiFi profile is unique to the WiFi client device as a result of being created by the AC based on the identification information; and
    establishing, by the client security application, a WiFi connection with the WiFi network using the WiFi profile.

2. The method of claim 1, further comprising storing, by the client security application, the WiFi profile within a WiFi profile repository of the WiFi client device.

3. The method of claim 1, wherein the WiFi profile comprises information indicative of a service set identification (SSID), a security type, an encryption type, a security key and user authentication information.

4. The method of claim 1, wherein the WiFi profile is encrypted.

5. The method of claim 4, further comprising decrypting, by the client security application, the encrypted WiFi profile.

6. The method of claim 1, wherein the identification information comprises one or more of a media access control (MAC) address of the WiFi client device, a device name of the WiFi client device and an email address of a user of the WiFi client device.

7. A WiFi client device comprising:
    a non-transitory storage device having embodied therein instructions representing a client security application for managing the security of the WiFi client device; and
    one or more processors coupled to the non-transitory storage device and operable to execute the client security application to perform a method comprising:
    establishing a near-field communication (NFC) connection via an NFC device of the WiFi client device with a peer NFC device that is coupled to a wireless access point controller (AC) of a WiFi network;
    causing the AC to dynamically create a WiFi profile associated with the WiFi network by transmitting identification information associated with the WiFi client device to the AC through the NFC connection;
    obtaining the WiFi profile via the NFC device, wherein the WiFi profile is unique to the WiFi client device as a result of being created by the AC based on the identification information; and
    establishing a WiFi connection with the WiFi network using the WiFi profile.

8. The WiFi client device of claim 7, wherein the method further comprises storing the WiFi profile within a WiFi profile repository of the WiFi client device.

9. The WiFi client device of claim 7, wherein the WiFi profile comprises information indicative of a service set identification (SSID), a security type, an encryption type, a security key and user authentication information.

10. The WiFi client device of claim 7, wherein the WiFi profile is encrypted.

11. The WiFi client device of claim 10, wherein the method further comprises decrypting the encrypted WiFi profile.

12. The WiFi client device of claim 7, wherein the identification information comprises one or more of a media access control (MAC) address of the WiFi client device, a device name of the WiFi client device and an email address of a user of the WiFi client device.

* * * * *